United States Patent

Owens

[15] 3,688,783
[45] Sept. 5, 1972

[54] SANITIZING APPARATUS
[72] Inventor: William E. Owens, P.O. Box 219, Buffalo, Mo. 65622
[22] Filed: Aug. 17, 1970
[21] Appl. No.: 64,349

[52] U.S. Cl. ............... 134/99, 21/79, 134/169 R, 134/171
[51] Int. Cl. ............... B08b 9/08, B08b 3/02
[58] Field of Search .......... 21/58, 78, 79; 134/21, 22, 134/23, 24, 99, 171, 169 R

[56] References Cited

UNITED STATES PATENTS

| 2,558,628 | 6/1951 | Redin | 21/78 X |
| 1,851,002 | 3/1932 | Davis | 21/79 UX |
| 3,208,460 | 9/1965 | Heinicke | 134/22 R |
| 1,620,654 | 3/1927 | Haugen | 134/169 R |
| 2,228,520 | 1/1941 | Hodsdon | 134/171 |
| 3,012,566 | 12/1961 | Baker | 134/171 X |
| 3,629,005 | 12/1971 | Belden | 134/171 |

FOREIGN PATENTS OR APPLICATIONS

| 330,249 | 6/1930 | Great Britain | 21/79 |
| 748,929 | 4/1933 | France | 21/79 |
| 249,003 | 3/1926 | Italy | 21/79 |

Primary Examiner—Morris O. Wolk
Assistant Examiner—Joseph T. Zatarga
Attorney—Strauch, Nolan, Neale, Nies & Kurz

[57] ABSTRACT

A method of rinsing and disinfecting a milking machine including the steps of first rinsing the internal surfaces of the teat cups of the milking machine with a liquid such as water to remove any residual milk remaining thereon from a prior milking operation and then disinfecting the teat cups by spraying a predetermined metered quantity of pressurized disinfecting solution thereon to kill any bacteria in the cups before the bacteria can be transferred to the next cow to be milked.

A novel sanitizing apparatus for performing the above operation includes a plurality of double tubed nozzles over which the teat cups are placed. Each of the nozzles has one of its tubes connected to a source of rinse liquid, while the other tube is connected to a source of disinfecting solution by way of a metering device which ensures that a predetermined metered quantity of disinfecting solution is sprayed from the nozzles into the teat cups. A drain pan collects the rinse liquid and disinfectant solution as they drain from the teat cups and directs them into the floor drain normally provided in a barn.

3 Claims, 4 Drawing Figures

PATENTED SEP 5 1972
3,688,783
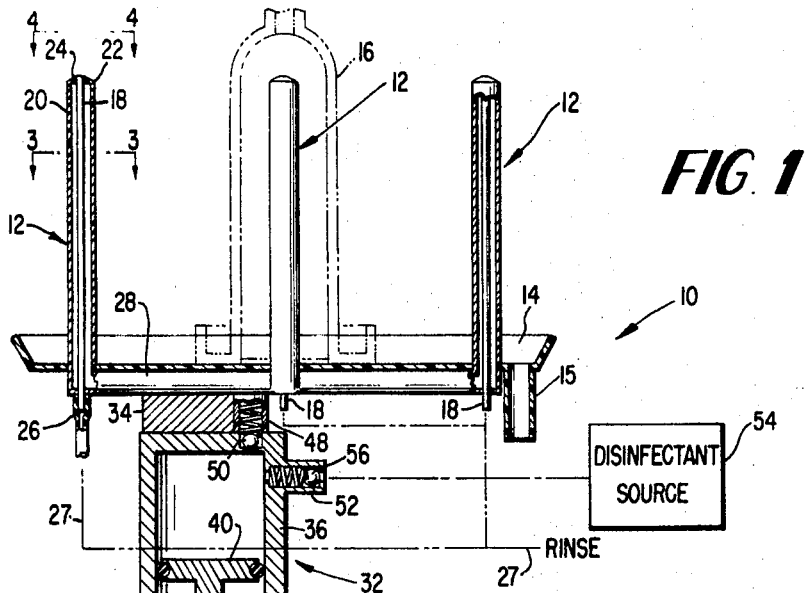
FIG. 1
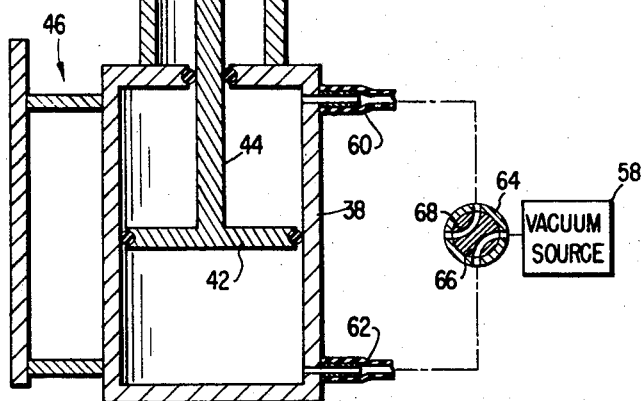
FIG. 4
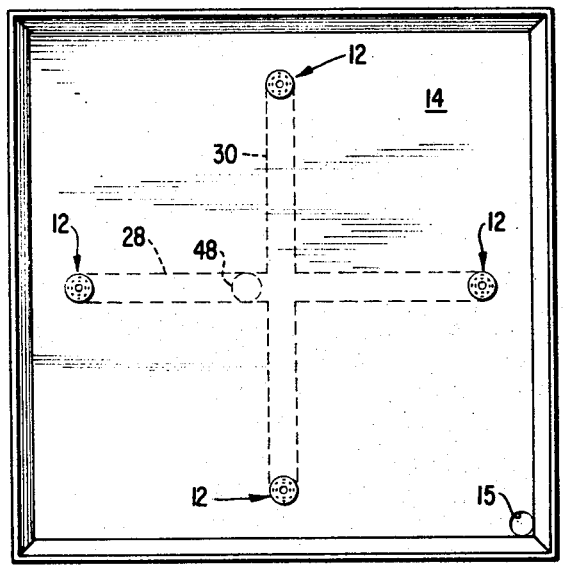
FIG. 3
FIG. 2
INVENTOR
WILLIAM E. OWENS
BY Strauch, Nolan, Neale, Nies & Kurz
ATTORNEYS 3,688,783

SANITIZING APPARATUS

BACKGROUND OF THE INVENTION

This invention relates generally to a system for sanitizing milking machines for cows, and more particularly to a novel method and apparatus for rinsing and disinfecting the teat cups of such milking machines after each cow is milked to prevent the spread of the infectious disease mastitis.

Mastitis is a disease which causes inflammation of the mammary glands of a cow and creates critical problems in the dairy industry. The effects of mastitis on dairy cows range from a minor infection to permanent damage of the cow which may lead to her sale, since she can no longer produce fluid milk suitable for consumption.

In the past, a great deal of study has been directed to this problem by the dairy industry in attempting to overcome this disease. The best defense against mastitis has been found to be good sanitation practices, since the disease is spread from cow to cow through contaminated lots and milk due to the highly infectious character of the disease. For example, it has been general practice to wash the udder of the cow when she comes into the barn, to disinfect the milkers by dipping them in a disinfecting solution before they are placed on the cow, and finally to again wash the udder after the milking operation.

While this conventional practice has helped reduce the occurence of mastitis, the spread of the disease has not been completely eliminated due particularly to the fact that the milkers are not sufficiently cleaned and disinfected before being placed on a cow. Accordingly it is this problem which this invention is intended to overcome and alleviate in order to prevent the spreading of infectious mastitis.

SUMMARY OF THE INVENTION

A primary purpose of the invention resides in the provision of a novel method and apparatus for rinsing and disinfecting milking machine teat cups after the cups are removed from one cow and before they are placed on another cow.

Another object of the invention resides in the provision of a novel method of rinsing and disinfecting the internal surfaces of teat cups of a milking machine by first rinsing the cups with a rinsing liquid spray and then disinfecting the cups by spraying a pressurized, predetermined metered quantity of disinfecting solution on the cup surfaces before they are placed on the next cow. In this manner, any bacteria in the teat cups picked up from a previous cow, which may have the disease mastitis, will be destroyed before they can be transferred to the next cow that is to be milked.

Still another object of the invention resides in the provision of novel apparatus for performing the described rinsing and disinfecting operation including a plurality of nozzles over which the teat cups may be readily placed, with each of the nozzles including two concentric tubes; one of which may be connected to a rinse liquid and the other of which is connected to a disinfectant solution by way of a metering pump assembly which delivers a pressurized predetermined amount of disinfecting solution to the other tube following the rinsing step.

Still another object of the invention resides in the provision of the apparatus described in the prior objects wherein the rinsing tubes of the nozzles may be connected to a conventional water supply and the metering pump may be vacuum operated by the available vacuum source which is normally part of conventional milking machines.

A further object resides in the provision of a novel method and apparatus for rinsing and disinfecting teat cups of a milking machine as set forth in the prior objects, to provide the chief advantage of preventing the spread of the infectious disease mastitis from one cow to another during a milking operation. A secondary, but yet very significant advantage obtained by the invention, is improved milking machine performance and extended life of the teat cups due to the fact that no residue of milk is permitted to collect and harden in the teat cups. When milk residues are permitted to dry in the cups, they form a deposit known as milkstone, which reduces the flexibility of the teat cup and consequently causes the milking machines to function improperly. The present invention very effectively eliminates these problems.

Other objects and advantages will become more apparent from reading the following detailed description of an illustrative embodiment of the invention while referring to the accompanying drawings, in which like elements are indicated by like numerals. However, it is understood that the described embodiment is merely illustrative, and is not intended to limit the scope of the invention which is defined only by the appended claims.

BRIEF DESCRIPTION OF THE DRAWINGS

FIG. 1 is a fragmentary sectional elevation view of an apparatus useful in practicing the invention;

FIG. 2 is a top plan view of the structure shown in FIG. 1 and particularly illustrating the arrangement of the spray nozzles and a drain pan for collecting the spent rinse fluid and disinfecting solution and also for supporting the teat cups in position around the nozzles;

FIG. 3 is a sectional view taken along line 3—3 of FIG. 1 and illustrating the manner in which each nozzle is formed by concentric inner and outer tubes; and FIG. 4 is a view taken along line 4—4 of FIG. 1 and illustrating the upper portion of each nozzle.

DETAILED DESCRIPTION OF THE INVENTION

Referring now to the drawings, the rinsing and disinfecting apparatus 10 of the invention is shown generally schematically in FIG. 1 and includes a plurality of upright nozzles 12 extending upwardly through a drain pan 14 which has an outlet 15 leading to the drain system of a barn. The conventional teat cups 16 of a milking machine may be supported on pan 14 in surrounding relation to nozzles 12 as shown in phantom in FIG. 1. Each of the nozzles 12 includes concentric inner and outer tubes 18 and 20, respectively, with tube 18 being opened through its upper end. The upper end of tube 20 is closed by a perforated cover 22 having a plurality of openings 24 through which the disinfecting solution is sprayed into the teat cup. Tube 20 may also be perforated along its side to disperse the disinfecting solution laterally from the nozzle if desired.

Each of the inner tubes 18 is connected at its lower end by a coupling 26 to a rinsing liquid supply 27 such as the conventional water supply of a barn. The bottom ends of outer tubes 20 are interconnected by conduits 28 and 30 which are mounted on top of a metering piston pump assembly 32 by way of a support plate 34.

Pump assembly 32 comprises an upper metering chamber 36 and a lower actuating piston chamber 38 within which metering piston 40 and actuating piston 42 connected to opposite ends of shaft 44 are reciprocally mounted, respectively. The entire device 10 may be supported from a wall or other suitable structure by a bracket 46 connected, for example, to the wall of actuating chamber 38.

Metering chamber 36 includes a conduit section 48 through which it communicates with conduit 28 via a check valve 50 which permits flow of liquid from chamber 26 to conduit 28 only, while preventing flow from conduit 28 back into chamber 36. Another conduit section 52 connects chamber 36 with a source of disinfecting solution 54 via a check valve 56 which permits flow of the liquid from source 54 to chamber 36 while preventing any reverse flow from chamber 36 to source 54.

Actuating piston 42 is operated from a vacuum source 56, such as that normally provided with a conventional milking machine, by way of upper and lower conduit sections 60 and 62 provided on opposite sides of actuating piston 42 and connected to vacuum source 58 through valve 64. Valve 64 has a first passage 66 adapted to connect one of the conduits 60 and 62 to vacuum source 58 and a second passage 68 for venting the other of conduits 60 and 62 to atmosphere.

In operation, after a milking machine has been used to milk one cow, the teat cups 16 will be placed over nozzles 12 to rest on drain pan 14. Initially, a rinsing liquid such as water from line 27 will be introduced into the inner tubes 18 and sprayed against the internal surfaces of cups 16 to remove any milk residues therefrom. Following the rinsing operation, valve 64 is positioned so that passage 66 connects conduit 62 to vacuum source 58 and passage 68 connects conduit 60 to atmosphere, thereby causing piston 42 to move downwardly in chamber 38. The resulting downward movement of metering piston 40 draws a predetermined quantity of disinfecting solution from source 54 through check valve 56 into metering chamber 36 until pistons 40 and 42 reach the bottom of chambers 36 and 38, respectively. At this time, the valve 64 is rotated through 90 degrees counterclockwise as viewed in FIG. 1 to connect conduit 60 to vacuum source 58 and to vent conduit 62 to atmosphere. Actuating piston 42 will then move upwardly in chamber 38 and as a result metering piston 40 also moves upwardly in chamber 36 to pressurize the disinfectant solution therein and cause it to pass outwardly through check valve 50 and conduit 48 into conduits 28 and 30 and subsequently outwardly through outer tubes 20 of spray nozzles 12. The disinfecting solution will be sprayed through the orifices 24 under pressure and will very effectively clean the internal surfaces of the teat cups 16 and destroy any bacteria which may be accumulated thereon.

During the sanitizing operation the spent rinse water from inner tubes 18 and the disinfecting solution from outer tubes 20 will be collected in drain pan 14 and carried away via outlet 15 to the drain system of the barn. It should be noted that at no time does the spent rinse water and disinfecting solution mix with the unused disinfecting solution. Furthermore, because of the operation of check valves 50 and 56 and the double-tubed nozzles 12, there is no possibility of the rinse water mixing with and diluting the disinfecting solution. Consequently, at all times a predetermined quantity of disinfecting solution from metering chamber 36 having a predetermined concentration is sprayed from nozzles 12 into the teat cups 16, thereby insuring that the spray disinfecting solution is of a sufficient concentration to kill any bacteria within the teat cups.

The teat cups 16 of each milking machine are rinsed in disinfectant as described above after they are used for milking each cow. Consequently, the danger of spreading the infectious disease mastitis from one cow to another is completely eliminated and the teat cups themselves retain their necessary flexibility due to the fact that milk deposits are not permitted to build up therein.

The described apparatus of the invention is very simple structurally, but yet very effective and reliable in operation and relatively inexpensive in cost. The piston pump assembly is readily operated by the already present vacuum source of the milking machine and the metering chamber, in conjunction with the check valves, insures that a proper predetermined quantity of disinfecting solution of a desirable concentration is directed outwardly from the spray nozzles into the teat cups.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

I claim:

1. Apparatus for sanitizing the teat cup of a milking machine comprising separate first and second nozzle means insertable into said teat cup, rinsing means including first conduit means connected to said first nozzle means for delivering a rinsing fluid to said first nozzle means to rinse residual milk from said teat cup, a source of disinfecting fluid, metering pump means including a metering chamber having inlet means connected to said disinfecting fluid source and outlet means connected to said second nozzle means via second conduit means which is separate from said first conduit means, a metering piston reciprocally mounted in said metering chamber, actuating means for reciprocating said metering piston, first check valve means mounted in said inlet means of said metering chamber permitting flow of disinfecting fluid only from said source into said metering chamber, second check valve means mounted in said outlet means of said metering chamber permitting flow of disinfecting fluid only from said metering chamber to said second conduit means, said actuating means comprising an actuating chamber and an actuating piston slidably mounted therein, an actuating fluid source including a vacuum power system normally provided with a milking machine, means connecting said vacuum power source to opposite sides of said actuating piston to drive said actuating piston in a selected direction, thereby moving said metering piston to first draw said disinfecting fluid from said disinfecting fluid source into said metering chamber and subsequently discharge said disinfecting fluid under pressure from said metering chamber through said second conduit means and said second nozzle means into said teat cup.

2. Apparatus as defined in claim 1, wherein said first and second nozzle means are formed by concentric inner and outer tubes, one of which is connected to said first conduit means and the other of which is connected to said second conduit means.

3. Apparatus for sanitizing a teat cup of a milking machine as defined in claim 1, comprising a plurality of said first and second nozzle means, each of said first nozzle means connected to said first conduit means and each of said second nozzle means connected to said second conduit means, and a drain pan adjacent said first and second nozzle means and adapted to collect the spent rinse fluid and disinfecting fluid from teat cups.

* * * * *